United States Patent [19]

Suzuki

[11] Patent Number: 5,409,287
[45] Date of Patent: Apr. 25, 1995

[54] AERODYNAMIC DEVICE

[75] Inventor: Ken Suzuki, Iwata, Japan

[73] Assignee: Yamaha Hatsudoki Kabushiki Kaisha, Iwata, Japan

[21] Appl. No.: 114,282

[22] Filed: Aug. 30, 1993

Related U.S. Application Data

[63] Continuation of Ser. No. 915,051, Jul. 16, 1992, abandoned.

[30] Foreign Application Priority Data

May 1, 1992 [JP] Japan .................................. 4-139760
Jun. 9, 1992 [JP] Japan .................................. 4-149540

[51] Int. Cl.⁶ ......................... B62D 35/00; A42B 1/06
[52] U.S. Cl. ............................... 296/180.1; 296/78.1;
296/91; 296/96.15; 244/130; 180/903; 15/313; 2/410
[58] Field of Search ..................... 296/78.1, 96.15, 91, 296/180.1, 180.5, 180.2; 244/130; 180/903; 2/410; 15/250.003, 301, 313, 316.1

[56] References Cited

U.S. PATENT DOCUMENTS

| 3,525,486 | 8/1970 | Wimpenny | 244/130 X |
| 4,284,302 | 8/1981 | Drews | 296/185 |
| 4,455,045 | 6/1984 | Wheeler | 296/185 |
| 4,664,345 | 5/1987 | Lurz | 244/130 X |
| 4,822,067 | 4/1989 | Matsuo | 180/903 X |
| 4,838,603 | 6/1989 | Masoero | 296/180.1 |

FOREIGN PATENT DOCUMENTS

| 0462511 | 12/1991 | European Pat. Off. . | |
| 2485654 | 12/1981 | France . | |
| 0158382 | 1/1983 | German Dem. Rep. | 296/180.1 |
| 4008240 | 12/1990 | Germany | 296/185 |
| 501231 | 11/1954 | Italy | 296/91 |
| 59-24684 | 2/1984 | Japan . | |
| 59-246845 | 2/1984 | Japan . | |
| 59-54383 | 4/1984 | Japan . | |
| 61-27774 | 2/1986 | Japan . | |
| 62-138685 | 9/1987 | Japan . | |
| 275287 | 6/1990 | Japan . | |
| 275288 | 6/1990 | Japan . | |
| 275289 | 6/1990 | Japan . | |
| 223203 | 12/1925 | United Kingdom | 244/130 |
| 750305 | 6/1956 | United Kingdom . | |
| 792243 | 3/1958 | United Kingdom . | |
| 2093152 | 8/1982 | United Kingdom . | |

*Primary Examiner*—Dennis H. Pedder
*Attorney, Agent, or Firm*—Knobbe, Martens, Olson & Bear

[57] ABSTRACT

Several embodiments of aerodynamic devices for improving the drag coefficient and reducing the wind resistance of a body moving through the air such as a motorcycle and/or a helmet worn by a rider of the motorcycle. The aerodynamic devices comprise a plenum chamber to which air is delivered through a relatively small ram air inlet opening. Air is discharged from the plenum chamber through a plurality of small apertures for generating a thin turbulent boundary layer between the body surface and the air flowing across the surface to promote laminar flow across the body surface.

6 Claims, 8 Drawing Sheets

AERODYNAMIC DEVICE

This is a continuation of U.S. patent application Ser. No. 915,051, filed Jul. 16, 1992, now abandoned.

BACKGROUND OF THE INVENTION

This invention relates to an aerodynamic device, and more particularly to an improved aerodynamic device for vehicular applications to reduce wind resistance and improve the coefficient of drag.

The desirability of improving the wind resistance and reducing the coefficient of drag in vehicular applications are well acknowledged. In addition to improving performance, good wind resistance and low coefficients of drag can also improve fuel economy. A wide variety of streamlined configurations and aerodynamic devices have been proposed for vehicular application in order to achieve these goals.

One of the greatest causes of aerodynamic drag is the boundary condition which exists at the layer between the surface of the body moving through the air and the surrounding air. It is desirable to provide a laminar flow condition of the air across the body surface to reduce coefficient of drag and wind resistance. However, regardless of how streamlined the shape of the body is, some disruption of air flow occurs at the boundary layer and this can significantly increase the drag and flow resistance.

It is, therefore, a principal object of this invention to provide an improved aerodynamic device.

It is a further object of this invention to provide an improved aerodynamic device which generates a boundary layer of turbulent air between the body moving through the air and the surrounding air so as to promote a laminar flow condition of the surrounding air over the body surface.

Although various aerodynamic devices have been proposed for improving the coefficient of drag of a body, these devices may be operative at one speed but may, due to their very nature, cause disruptions in the air flow at other speeds that can increase the drag. It is, therefore, a still further object of this invention to provide an improved aerodynamic device for reducing drag and which will not increase the drag under any condition.

SUMMARY OF THE INVENTION

This invention is adapted to be embodied in an aerodynamic device for reducing the wind resistance of a body moving through the air. The body has a surface which penetrates the air and across which the air flows as the body moves through the air. In accordance with the invention, means are provided for generating a boundary layer of turbulent air between the body surface and the air flowing across the body surface to promote laminar air flow.

DETAILED DESCRIPTION OF THE PREFERRED EMBODIMENTS OF THE INVENTION

Figure 1:
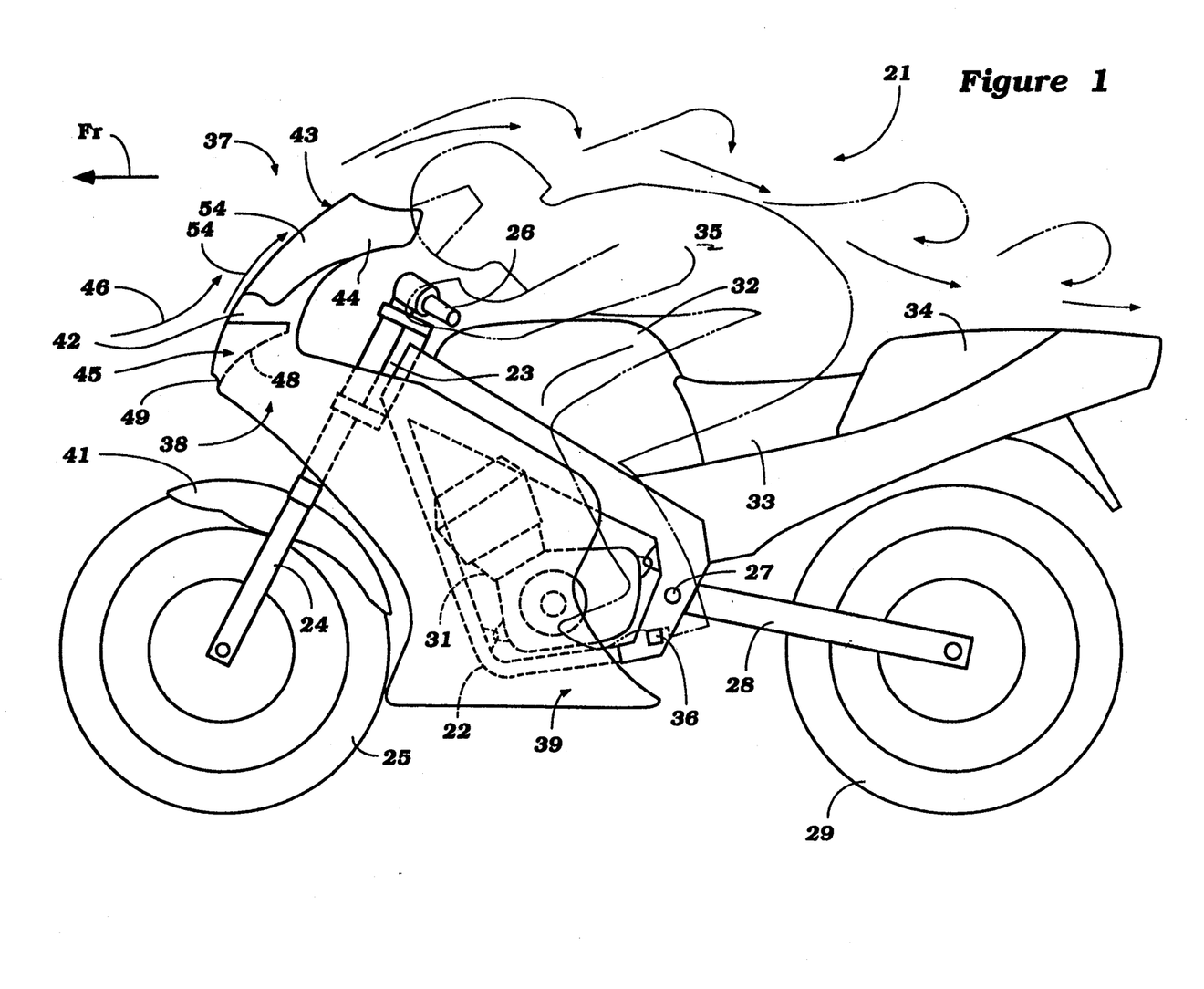
FIG. 1 is a side elevational view of a motorcycle having an aerodynamic device constructed in accordance with an embodiment of the invention.

Referring first to the embodiment of FIGS. 1-7 and initially to FIG. 1, a motorcycle embodying an aerodynamic device constructed in accordance with a first embodiment of the invention is identified generally by the reference numeral 21. The invention is described in conjunction with a motorcycle, however, it should be readily apparent to those skilled in the art that the invention can be applied to other types of vehicles or, as will become apparent, to the riders or apparel of the riders of such vehicles.

The motorcycle 21 includes a frame assembly, indicated generally by the reference numeral 22, and having a head pipe 23 that journals a front fork 24 for steering movement in a well known manner. A front wheel 25 is rotatably journaled by the front fork 24 and is steered by means of a handlebar assembly 26 that is affixed to the front fork assembly 24 above the head pipe 23.

The rear portion of the frame assembly 22 carries a pivot pin 27 which pivotally journals a forward end of a trailing arm 28. The rear end of the trailing arm 28 rotatably journals a rear wheel 29 in a suitable manner. Pivotal movement of the trailing arm 28 is controlled by a suspension assembly (not shown) which includes a spring and shock absorber.

An internal combustion engine 31 is supported in the frame assembly 22 in a suitable manner and drives the rear wheel 39 in any well known manner.

A fuel tank 32 for supplying fuel to the engine 31 is carried by the frame assembly 22 on its upper surface and rearwardly of the head pipe 23. A seat 33 is carried by the frame assembly 22 to the rear of the fuel tank 32 and a tandem passenger seat 34 is supported rearwardly of the operator's seat 33. A rider, shown in phantom at 35, is adapted to operate the motorcycle 21 and may ride in a crouched position as shown in the figures so as to improve the aerodynamics of the motorcycle. The rider 35 may place his feet on loot pegs 36 carried at the lower portion of the frame assembly 22 and adjacent the rear arm pivot point 27.

In accordance with a feature of the invention, the motorcycle 21 is provided with a partial body assembly, indicated generally by the reference numeral 37, and the construction of which may be best understood by additional reference to FIGS. 2–7. This body assembly 37 serves a combined function of offering a shield to the rider 35, protecting certain components of the motorcycle such as the engine 31 and providing a streamlining effect to reduce the wind resistance and coefficient of drag for the motorcycle 21. The body assembly 37 is comprised of a main portion, indicated generally by the reference numeral 38, which has a pair of downwardly extending side portions 39 which extend along opposite sides of the engine 31 and which enclose the forward and lower portion of the frame assembly 22. This main portion 38 also lies over a front fender 41 carried by the front fork assembly 24 above the front wheel 25.

The body assembly 37 further includes a cowling portion 42 that extends upwardly in front of the head pipe 23 and which carries a transparent windshield 43 at its upper end. It should be noted that the windshield 43 smoothly merges into the cowling portion 42 so as to avoid any disruptions in the smooth flow of air there across. The windshield 43 also has side portions 44 that curve around and merge into the corresponding sides of the cowling portion 42 so as to continue to offer a smooth configuration.

The body 37 is configured so as to provide a streamlined configuration, as aforenoted. In addition, however, an aerodynamic device, indicated generally by the reference numeral 45, is provided so as to generate a turbulent boundary layer, shown in FIG. 2 and identified by the reference numeral 46, between the surface of the body 38 and particularly the cowling portion 42 and the air flowing across the front of the motorcycle.

The aerodynamic device 45 includes a plenum chamber, indicated generally by the reference numeral 47, which is formed by the inner surface of the cowling portion 42 and a body piece 48 that is affixed thereto on its inner surface. At approximately the leading edge of the body 37 there is provided a relatively narrow air inlet slit 49 which receives ram air from the air flow as shown by the arrow 51. The slit 49 has a relatively small cross-sectional area compared to the cross-sectional area of the plenum chamber 47. As a result, this slit 49 will offer very little flow resistance regardless of the speed at which the motorcycle is traveling, but nevertheless will collect sufficient air so as to generate turbulence, in the manner which will now be described.

Figures 5, 6:
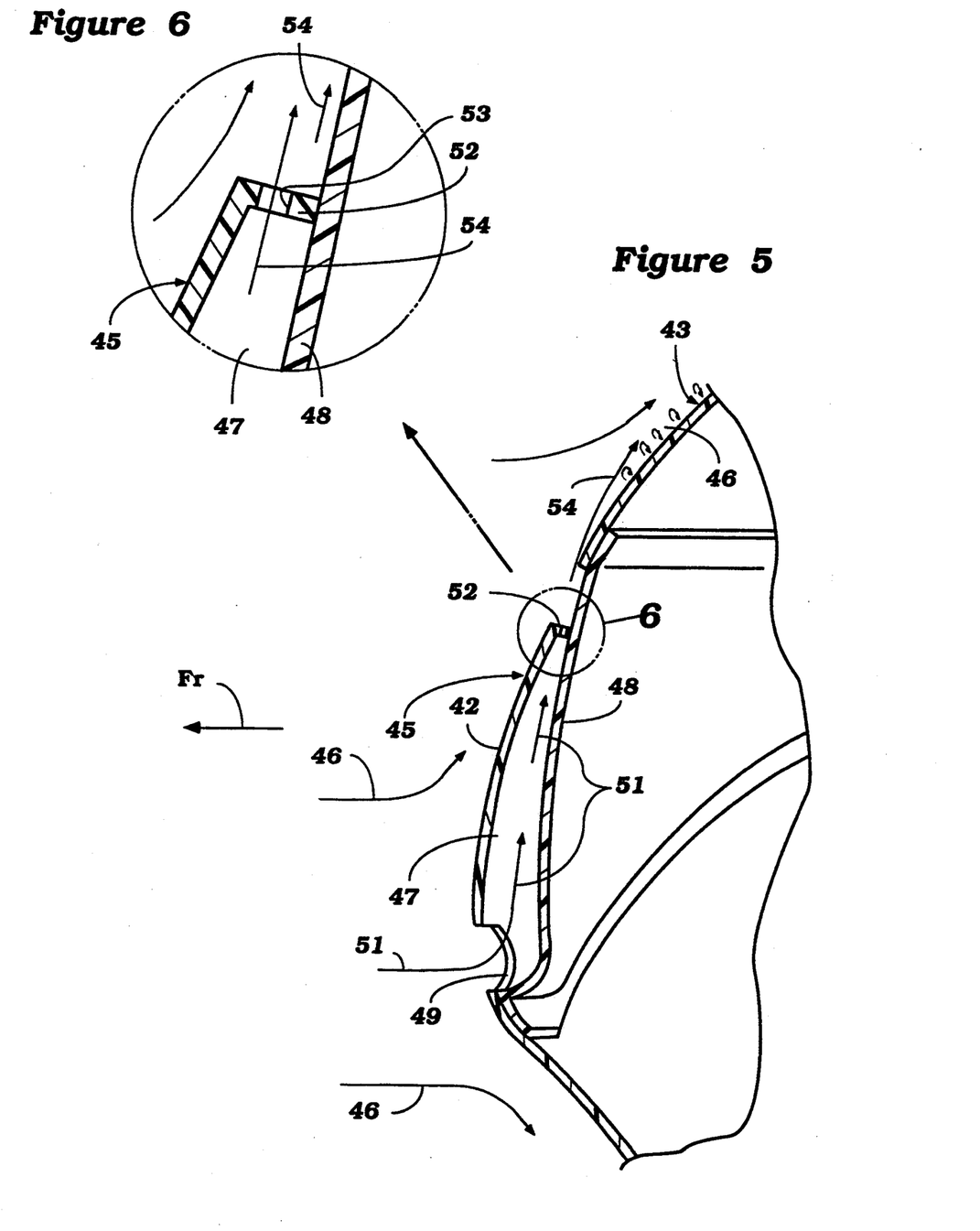
FIG. 5 is an enlarged cross-sectional view taken along the line 5—5 of FIG. 4.
FIG. 6 is a further enlarged cross-sectional view showing the area encompassed by the circle 6 in FIG. 5.
Figure 7:
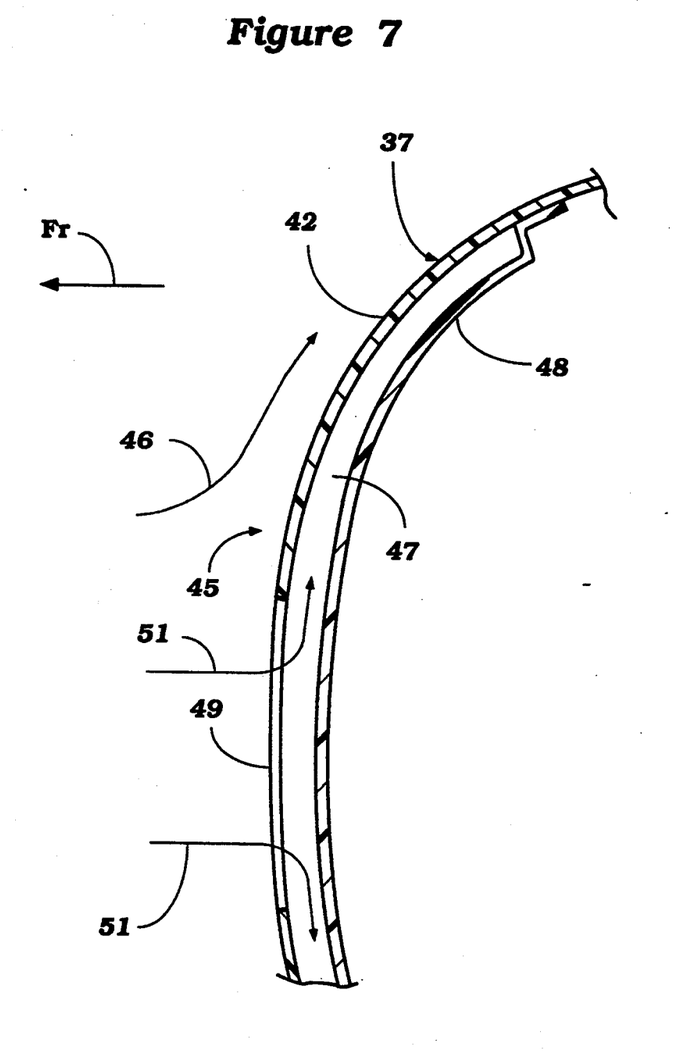
FIG. 7 is an enlarged cross-sectional view taken along the line 7—7 of FIG. 4.
Figure 8:
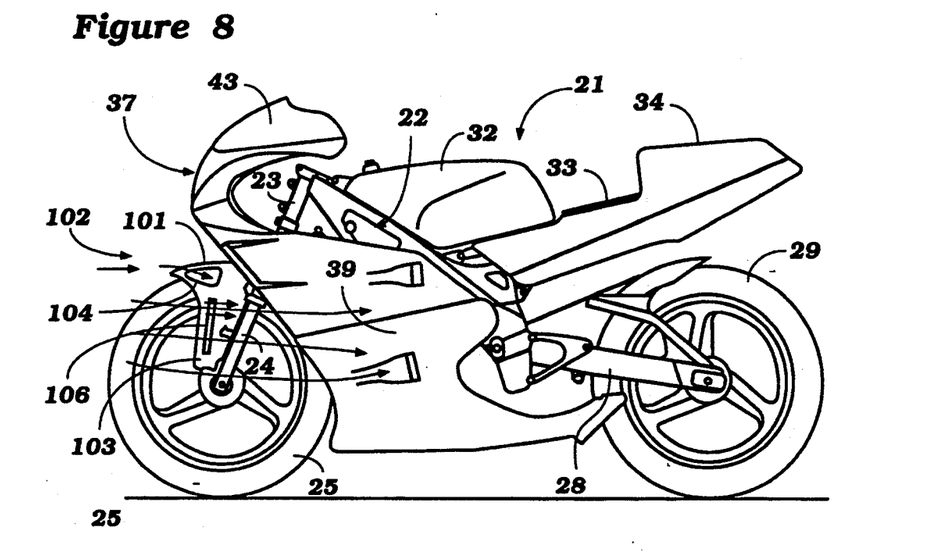
FIG. 8 is a side elevational view of a motorcycle having another form of aerodynamic device constructed in accordance with an embodiment of the invention.
Figure 9:
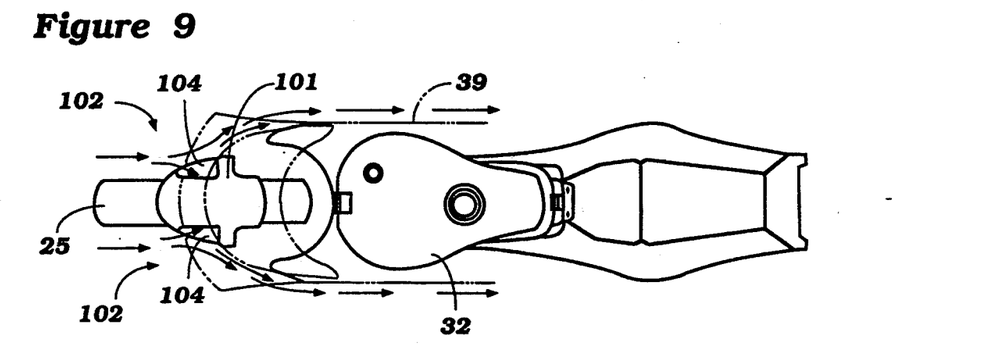
FIG. 9 is a top plan view of the motorcycle shown in FIG. 8.
Figure 10:
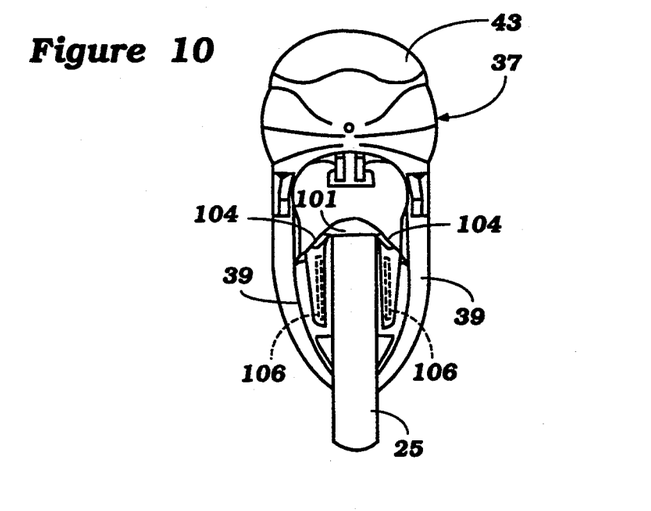
FIG. 10 is a front elevational view of the motorcycle.

There is provided a lip 52 at the upper end of the plenum chamber 47, which lip 52 offers a minimum obstruction in the flow area of the configuration of the front of the motorcycle body 37 as clearly shown in FIG. 5. However, the lip 52 is provided with a plurality of relatively small openings 53 from which the air in the plenum chamber 47 may be discharged as shown by the arrows 54. This discharged air will cause swirls or eddy currents to form along the front of the motorcycle body portion 37 and particularly the cowling portion 42 and wind screen 43 so as to provide a turbulent boundary layer so that the remainder of the air flowing across the front of the body can be separated by this boundary layer 46 and flow in a laminar manner to provide an extremely effective aerodynamic device. Because of this boundary layer, the coefficient of drag for the motorcycle 21 will be substantially improved.

Figure 2:
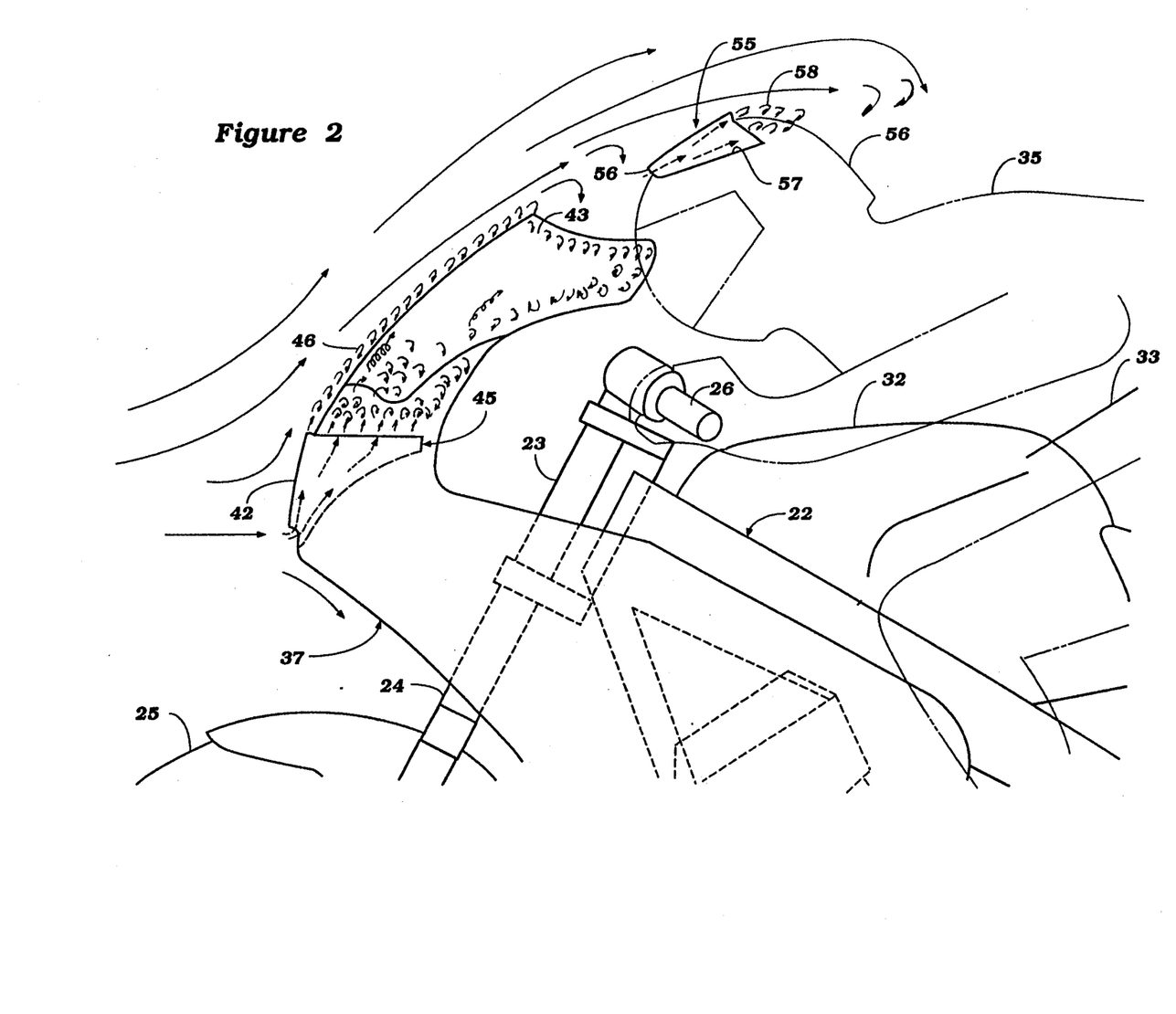
FIG. 2 is an enlarged side elevational view showing how the air flow patterns are generated with the aerodynamic device and also showing an aerodynamic device in accordance with an embodiment on the helmet of the rider.
Figure 3:
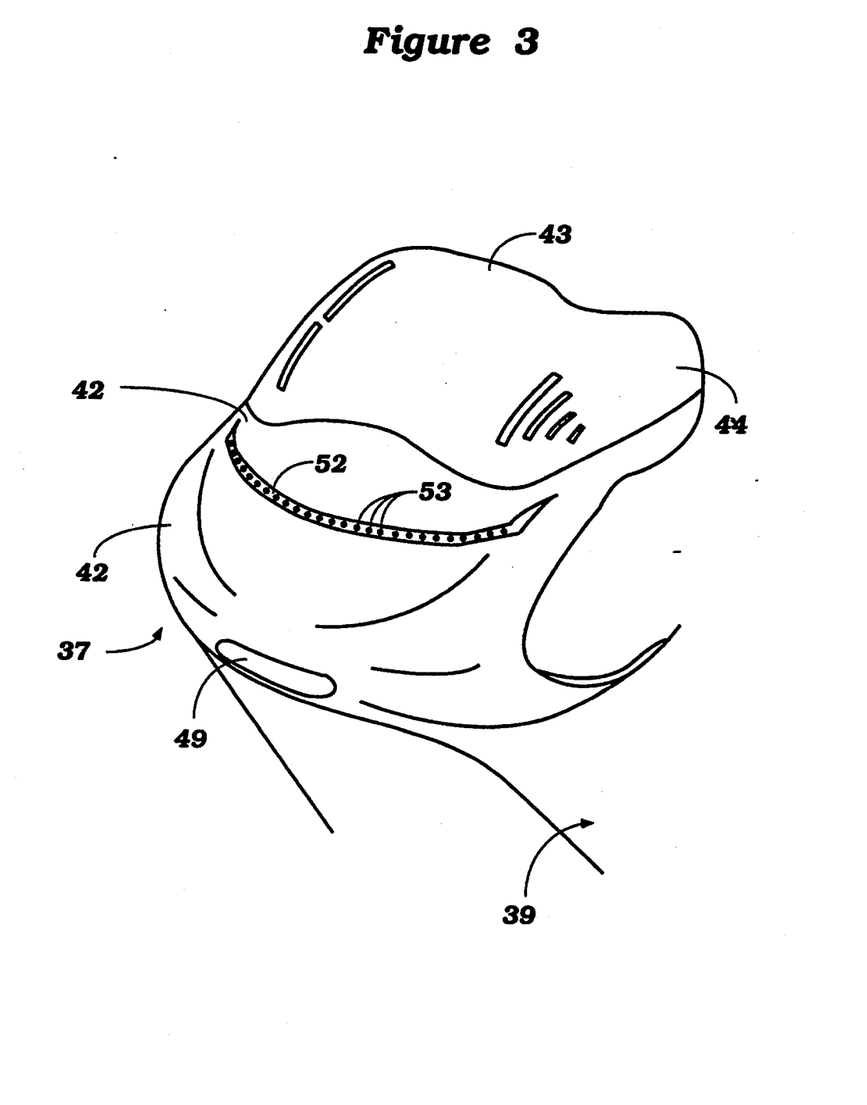
FIG. 3 is a front perspective view of the cowling and shows the aerodynamic device.
Figure 4:
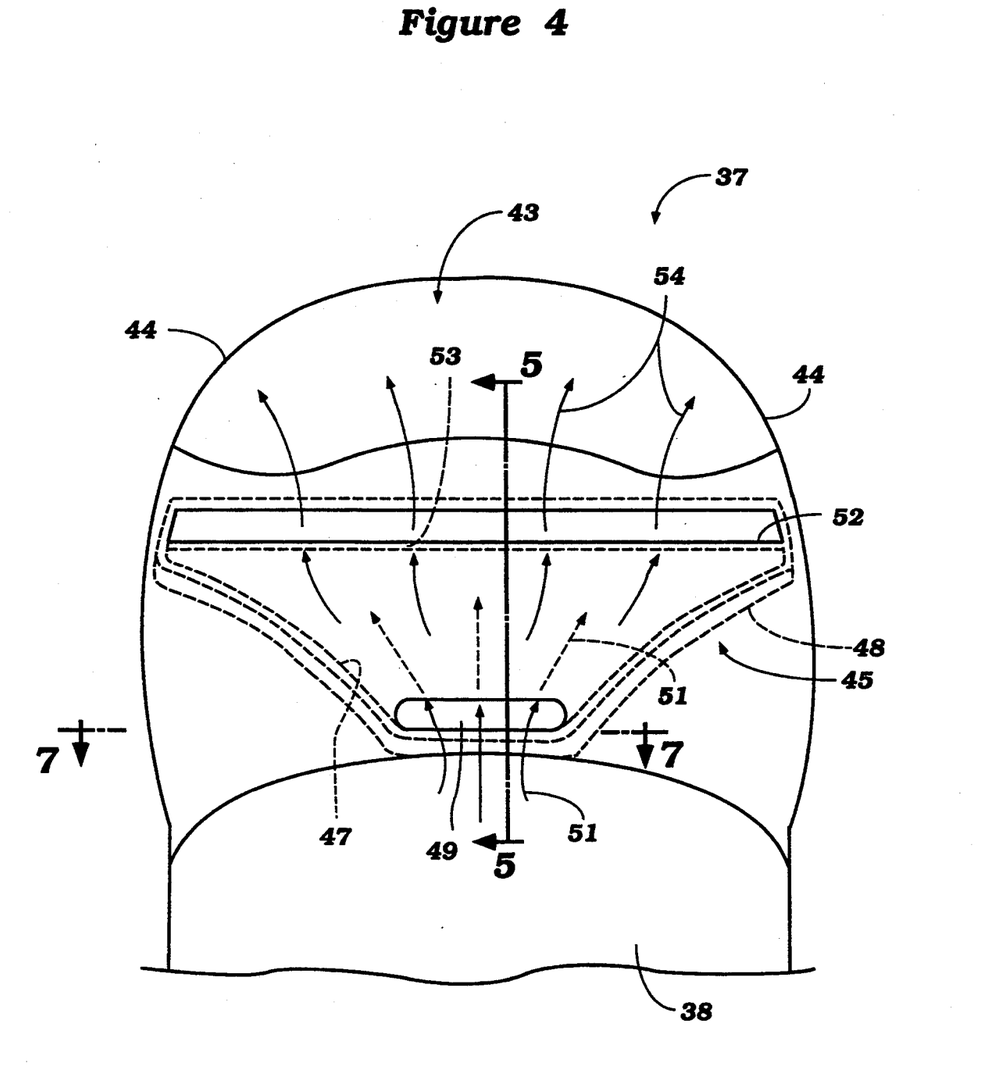
FIG. 4 is a front elevational view of the area shown in FIG. 3.

In addition to the aerodynamic device 45, a similar aerodynamic device 55 may be mounted on a helmet 56 of the rider 35. Like the aerodynamic device 45, the aerodynamic device 55 has a generally narrow inlet opening slit 56 and defines an internal plenum chamber 57 to receive ram air. A plurality of perforated openings at the opposite end of the plenum chamber 57 generate eddy current turbulent air 58 that forms a boundary layer between the outer periphery of the helmet 56 and the flowing air.

It should be readily apparent from the description of the embodiment of FIGS. 1–7 that the aerodynamic devices 45 and 55 are extremely effective in improving the coefficient of drag of not only the body of a vehicle but also the helmet worn by the rider. In the foregoing embodiment, the body aerodynamic device 45 has been placed upon the main body portion at the base of the windshield 43.

Of course, this same type of device may be employed on other portions of the body and FIGS. 8–13 show an embodiment wherein an aerodynamic device is positioned on the front fender and cooperates with the front fork. Since the basic construction of the motorcycle of this embodiment is the same as that previously described, components which are the same as the previously described embodiment have been identified by the same reference numerals and will be described again only insofar as is necessary to understand the construction and operation of this embodiment.

In this embodiment, a front fender assembly 101 is positioned over the front wheel 25 and cooperates with the front fork 24 to provide streamlining for this front fork. The front fender 101 includes a pair of aerodynamic devices, indicated by the reference numeral 102, each of which is positioned on a respective side of the front fender 101. The front fender 101 has a pair of skirt portions 103, each of which lie on a respective side of the front wheel 25 forwardly of the corresponding sides of the front fork 24. The aerodynamic devices 102 include air inlet openings 104 which are faired into the shape of the fender 101 and have a relatively small cross-sectional area so as to offer very little flow resistance but nevertheless so as to permit ram air to enter therethrough.

Figure 11:
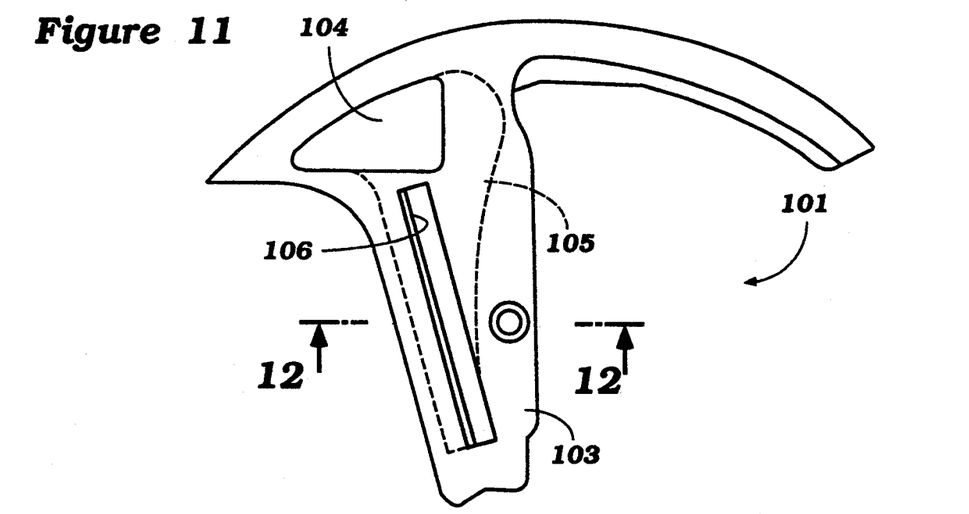
FIG. 11 is an enlarged side elevational view showing the aerodynamic device.
Figure 12:
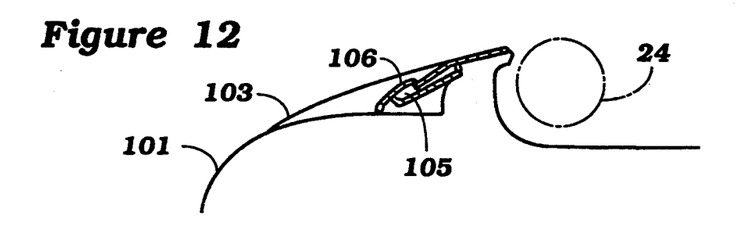
FIG. 12 is a cross-sectional view taken along the line 12—12 of FIG. 11.
Figure 13:
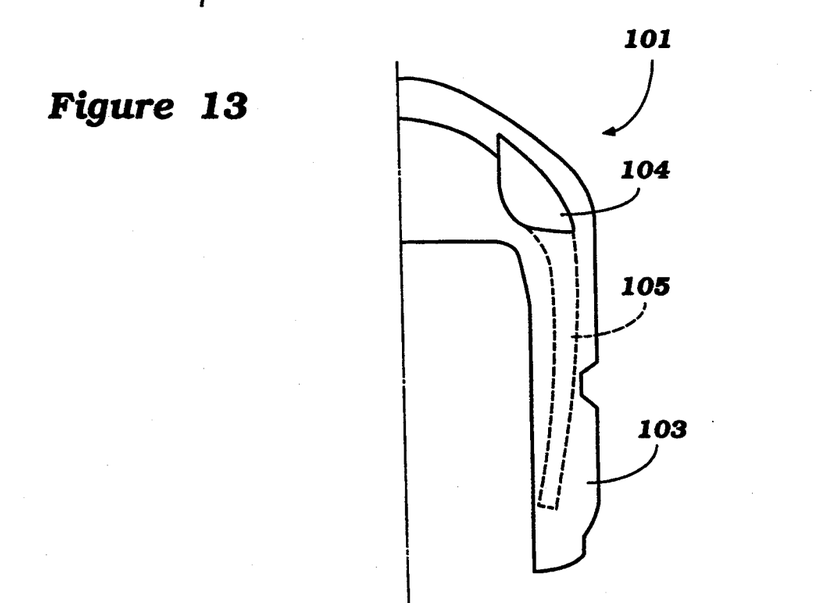
FIG. 13 is a front elevational view of the area shown in FIGS. 11 and 12.

This ram air then flows into a plenum chamber 105 positioned on each of the skirt portions 103 and which has an effective cross-sectional area substantially greater than that of the inlet openings 104 and also a fairly substantial volume. A pair of vertically extending rearwardly facing surfaces 106 extend forwardly of the side portions of the fork 24 and is formed with a plurality of small perforate openings for discharging turbulent air in a rearward direction so as to cause a turbulent air boundary layer between the side portions 103 and fork 24 and the air flowing there across. Therefore, this turbulent air provides the boundary layer and promotes a laminar air flow above the surface and the advantages of the previously described embodiment.

It should be readily apparent from the foregoing description that the described embodiments of the invention provide extremely effective aerodynamic devices which create a turbulent boundary layer between the body on which the effect is to be generated and the laminar air flowing across the body so as to reduce air resistance and improve drag coefficient. Several body locations have been illustrated and it should be readily apparent to those skilled in the art that this concept can be used at various places on the body of a vehicle and/or on articles worn by riders of the vehicle over their exposed areas. Of course, various other changes and modifications may be made without departing from the spirit and scope of the invention, as defined by the appended claims.

I claim:

1. An aerodynamic device for reducing the wind resistance of a body moving through the air, said body having a forwardly directed surface which penetrates the air and across which the air flows as said body moves through the air, the improvement comprising turbulence generating means for generating a boundary layer of turbulent air between said body surface and the air flowing across said body surface for promoting laminar air flow, said turbulence generating means comprising a ram air inlet opening formed in said body and facing forwardly to receive ram air flow, a plenum chamber formed beneath said body surface and having a substantial volume for accumulating high pressure air therein, and a plurality of spaced openings formed in said body and discharging the high pressure air from said plenum chamber in proximity to the body surface downstream of said ram air inlet opening to generate a turbulent air boundary layer along said body surface.

2. An aerodynamic device as set forth in claim 1 wherein the body comprises a body of a vehicle.

3. An aerodynamic device as set forth in claim 2 wherein the body surface is formed at the base of a windshield.

4. An aerodynamic device as set forth in claim 1 wherein the body comprises a helmet adapted to be worn by the rider of a vehicle.

5. An aerodynamic device as set forth in claim 1 wherein the body comprises a body at least partially covering a wheel of a vehicle.

6. An aerodynamic device as set forth in claim 5 wherein the wheel comprises a front wheel of a motorcycle carried by a front fork and wherein the body lies forwardly of the front fork and the means for generating the boundary layer of turbulent air forms a boundary layer over the body and also over at least a portion of the front fork.

* * * * *